Feb. 6, 1968 R. B. CRONHEIM 3,368,068
ILLUMINATED MIRROR
Filed Sept. 16, 1965 3 Sheets-Sheet 1

INVENTOR
RICHARD B. CRONHEIM

BY Ralph W. Kalish
ATTORNEY

Feb. 6, 1968  R. B. CRONHEIM  3,368,068
ILLUMINATED MIRROR

Filed Sept. 16, 1965  3 Sheets-Sheet 3

INVENTOR
RICHARD B. CRONHEIM

BY *Ralph W. Kalish*

ATTORNEY

United States Patent Office 3,368,068
Patented Feb. 6, 1968

3,368,068
ILLUMINATED MIRROR
Richard B. Cronheim, 411 N. 7th St.,
St. Louis, Mo. 63101
Filed Sept. 16, 1965, Ser. No. 487,683
10 Claims. (Cl. 240—4.2)

ABSTRACT OF THE DISCLOSURE

An illuminated mirror having a housing, at least one forwardly and upwardly opening recess provided in said housing, a mirror-carrying frame pivotally mounted on the upper portion of said housing for movement downwardly toward said housing into collapsed position, at least one arm swingably mounted on the side of said housing and carrying a lamp member at its outer end, said arm being telescopic and so mounted as to cause said lamp member to be receivable within the said recess when in inoperative position.

---

This invention relates in general to lighting devices and, more particularly, to an illuminated mirror.

It has for many years been a common practice to illuminate mirrors which are used for various facial purposes. For example, the ordinary bathroom mirror is quite commonly illuminated with one overhead light or a plurality of side-lights to illuminate the face for shaving. Such mirrors are ordinarily mounted upon the wall of a bathroom or incorporated into the door of a medicine cabinet and are, for all practical purposes, fixed, non-adjustable arrangements. Another example of an illuminated mirror is found in theatrical dressing rooms wherein a large mirror is mounted on a wall or upon a dressing table and surrounded by a frame having a multiplicity of electrical sockets and bulbs so that the user's face is highly illuminated for the purpose of applying theatrical makeup.

Heretofore, various efforts have been made to provide an illuminated mirror which is portable, adjustable, and otherwise more convenient to use than large, permanently-fixed illuminated mirrors. However, such devices have consistently proved quite cumbersome, and not sufficiently compact for convenient portability as for disposition within a small traveling bag. Additionally, all existing types of illuminated mirrors use relatively large, incandescent light bulbs which are bulky and fragile, with the result that the same are difficult to pack for traveling purposes.

It is, therefore, the primary object of the present invention to provide an illuminated mirror which is compact, attractive in appearance, and convenient to use.

It is another object of the present invention to provide an illuminated mirror in which both the mirror itself and the light source associated therewith are fully adjustable through a wide range of different positions.

It is also an object of the present invention to provide an illuminated mirror which can be folded into a very compact, transport position so as to render same completely portable, and easily packed for traveling purposes.

It is an additional object of the present invention to provide an illuminated mirror having improved, fully adjustable light sources capable of casting high-intensity beams of light upon the face of the user.

It is also an object of the present invention to provide an illuminated mirror with light sources which are electrically safe and in which the light bulbs can be quickly and conveniently changed without hazard.

Other objects and details of the present invention will be apparent from the following description when read in connection with the accompanying drawings (three sheets), wherein—

Figure 1:
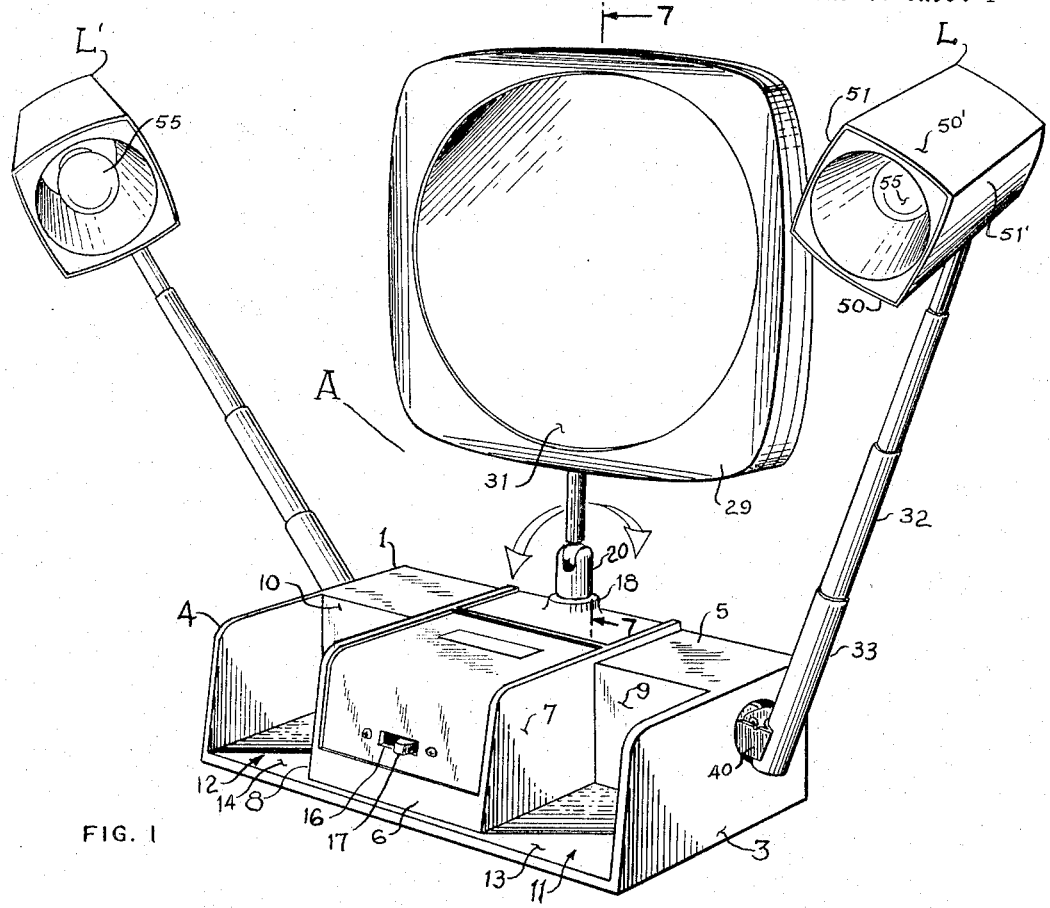
FIGURE 1 is a perspective view of an illuminated mirror constructed in accordance with and embodying the present invention illustrating the same in operative position.

Referring now by reference characters to the drawings which illustrate the preferred embodiment of the present invention, A generally designates an illuminated mirror comprising a thin-shelled body 1 preferably integrally molded from a synthetic resin, such as, for instance, polypropylene, but which may obviously be molded from any suitable material. Body 1 incorporates a rear wall 2, parallel end walls 3, 4, and a top wall 5, which extends between the rearward portions of said end walls 3, 4 and contains a central portion which in its forward end is continuous with a narrow front wall 6 located between, and equi-distant from, said end walls 3, 4. On its lateral edges front wall 6 is connected to side walls 7, 8, respectively, which are in planar parallel, spaced apart relationship to the inner faces of end walls 3, 4, respectively, so as to define therewith, in conjunction with an interconnecting facing wall 9, 10, respectively, upwardly and forwardly opening recesses or pockets 11, 12, respectively, for purposes presently appearing. Said recesses 11, 12 are provided with base walls 13, 14 extending between the related walls 3, 7, 9 and 4, 8, 10, respectively. It will thus be seen that rear wall 2, top wall 5, and front wall 6, together with walls 7, 8 and 9, 10, define a downwardly opening housing, which can best be seen in FIGURE 4; there being a bottom closure plate 15 for suitable securement, as by screws or the like, to mounting members provided in said housing for enclosing of the same. Front wall 6 is provided substantially centrally with an aperture 16 for extension therethrough of a switch knob 17 for convenience of operation for purposes shown hereinbelow.

Figure 7:
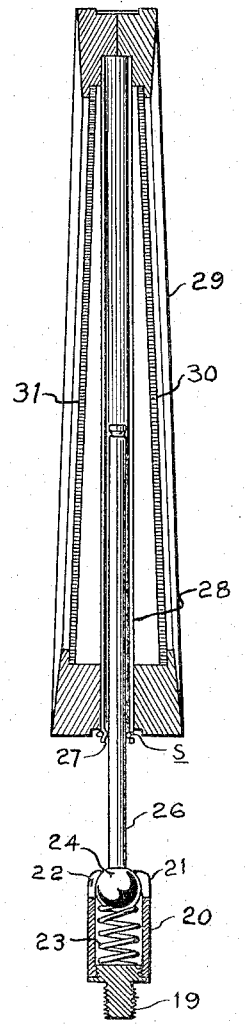
FIGURE 7 is a vertical view in partial section taken on the line 7—7 of FIGURE 1.

Centrally of the rear portion of top wall 5 is a threaded boss 18 (FIGURE 1) for engagement with a threaded fitting 19 which latter is secured within the lower end of a casing 20. Said casing 20 is provided with a rounded top wall 21 having a central arcuate, slot-like opening 22 progressing from front to rear of said top wall 21 but being eccentric in that the same extends a greater distance forwardly than rearwardly. Disposed within casing 20 is a helical spring 23 bearing at its lower end against the upper face of fitting 19 and at its upper end urging a ball 24 against top wall 21, which ball 24 is tapped for receiving the threaded lower end of a rod 26 which extends upwardly through opening 22 for reception within the bore 27 of a tubular housing 28 provided within a mirror frame, indicated generally at 29; said frame suitably supporting a pair of mirrors 30, 31 in back to back relationship (FIGURE 7) with one of said mirrors being preferably magnified. Said rod 26 is adapted to be moved relatively within said tubular housing 28 for permitting desired adjustment of mirrors 30, 31 vertically of top wall 5 to suit the particular convenience of the user. In order to maintain said mirror frame 29 in selected positionment upon rod 26, there is provided spring means *s* surrounding the lower end of tubular housing 28 at its lower end for urging the same into friction-producing relationship with respect to said rod 26.

Figure 2:
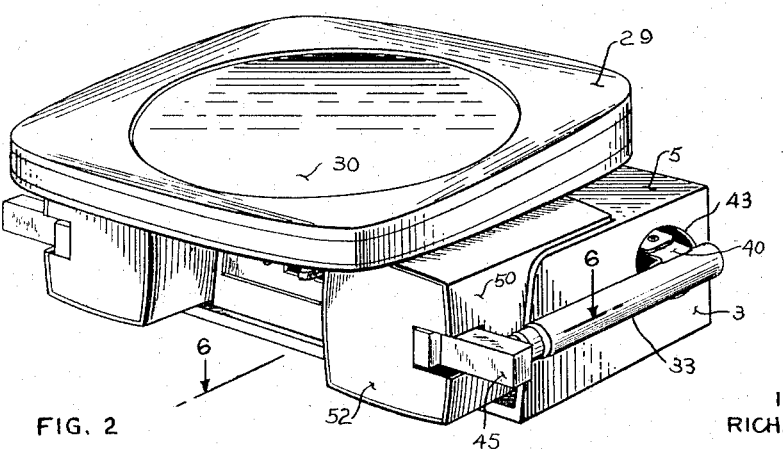
FIGURE 2 is a perspective view of the illuminated mirror illustrating same in collapsed position.

By means of the configuration of opening 22 and the spherical character of ball 24 it will be seen that the mirror frame 29 may be swung downwardly until rod 26 abuts the lower forward end of opening 22 for presenting said frame in collapsed position immediately above top wall 5 as may best be seen in FIGURE 2.

Frame 29 may be swung rearwardly until said rod 26 is in detaining engagement with the rearward end of opening 22 so as to allow of backward inclination. It is apparent that the length of opening 26 will determine the degree of rearward swing of mirror frame 29 but it has been found in practice that an angle of about 15° has proved most suitable.

Integrally provided, by structure now to be described, are mirror illuminating means which comprise a pair of high intensity lamps indicated generally at L, L', each incorporating hollow arms 32 which are comprised of a plurality of interfitting, extensible sections 33 of decreasing cross section toward the lamp ends. Mounting means for each of said arms 32 comprise a mounting plate 34 (FIGURE 4) provided fixedly within body 1 to which is suitably engaged a U-shaped base bracket 35 (FIGURE 5), the web 35' of which is directed toward the adjacent end wall 3, 4 and is connected by means of a swivel member 36 to the web 37 of a clevis or U-shaped member 38, the arms 39 of which are directed toward the proximate body end wall member 38, by reason of swivel unit 36, may be turned through an angle of 360° with respect to base bracket 35. Engaged to the inner face of arms 39 of member 37, as by rivets, are the flanges 40 of a mounting bracket 41 of general channel shape having an inwardly convex web 42 formed on a radius for direct, complemental engagement, as by a screw, to the bottom or lowermost section 33 of the related arm 32. As may best be seen in FIGURE 4, flanges 40 of bracket 41 extend outwardly through enlarged circular apertures 43 formed in the rearward portion of the proximate end wall 3, 4 so that the connection to the related arm 32 is outwardly of such end wall. By reason of the engagement of flanges 40 of bracket 41 to arms 39 of member 38, the said mounting bracket 41 and the engaged arm 32 are swingable about a center passing through the points of engagement of said flanges 40 to arms 39.

Figure 3:
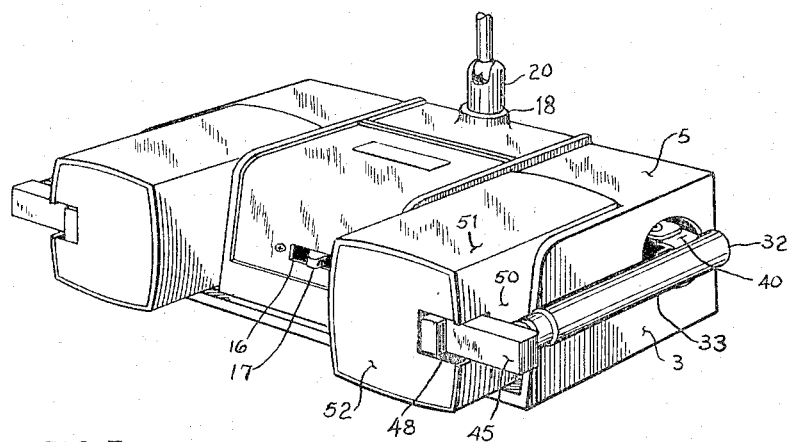
FIGURE 3 is a perspective view of the mirror in collapsed position but with the mirror portion removed.

In view of the foregoing it will be seen that arms 32 of lamps L, L' are accorded a wide range of adjustability so as to bring about the disposition of lamps L, L' effective for particular usage purposes. Thus, arms 32 by operation of swivel 36 may be swung within a vertical plane through an arc of 360 degrees, although, obviously such swinging would be limited by engagement of said arms 32 with the support surface or any adjacent, obstacle-forming means. Furthermore, the swingable mounting of bracket 41 allows said arms to be swung inwardly toward, or outwardly away from, mirror frame 29 with the limitations of such swinging caused by abutment of arms 32 against portions of the related end walls 3, 4. As clearly suggested above, the telescopic character of arms 32 will allow same to be extended, as shown in FIGURE 1, or to be collapsed or retracted, as shown in FIGURES 2 and 3, for purposes of reducing the present invention to its more compact form for storage in minimal space or for facilitating transportability. It is, of course, obvious that each of the lamps L, L' are independently mounted so that the same may each be adjusted as desired.

The outermost section 33 of each arm 32 is connected as by a grommet, or like swivel connector, 44 to a tubular link 45, which may be of quadrilateral in cross section, to a lamp housing 46; said link 45 projecting into said lamp housing 46 through an opening 47 in one side thereof which opening also opens through the outer end wall of said housing as at 48, so as to form a right angle aperture. Link 45 is pivotally engaged within said housing 46 as by means of a pin 49 so as to allow rocking of said housing 46 within substantially a 90° arc as determined by the abutment of said link 45 against the opposite ends of the right angular opening 47–48.

Lamp housing 46 is of general rectangular cross section having side walls 50, 50' and top and bottom walls 51, 51', there being an outer end wall 52, with the inner end being open, as at 53. If desired, the walls forming said housing 46 may be accorded a tapered effect so as to flare toward the open end 53. Provided within the open end of housing 46 is a conventional, inwardly converging reflector 54, with a bulb 55 at the inner end, which latter is received within a socket 56 fixed in said housing 46. Socket 56 is suitably connected to a conductor 57 which passes through housing 46, line 45, grommet 44, and telescopic arm 33 for connection at its inner end to the low side of a conventional 110–6 volt step-down transformer 58 carried within the housing portion of body 1 and being suitably mounted upon closure plate 15.

Figure 6:
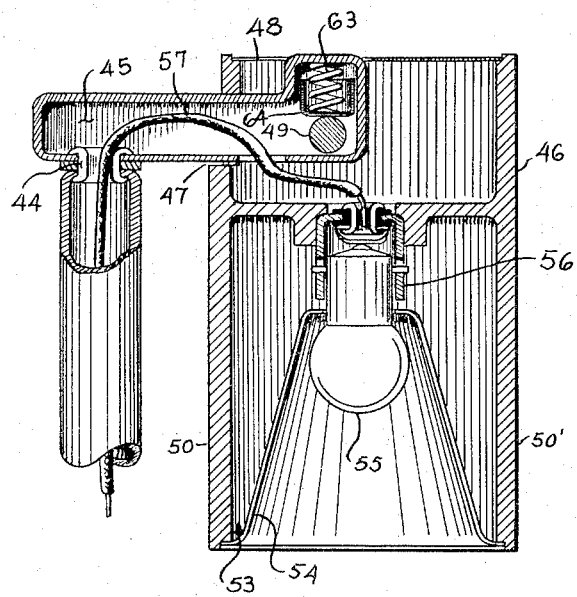
FIGURE 6 is a horizontal transverse sectional view taken along the line 6—6 of FIGURE 2.

As may best be seen in FIGURE 6, a coil spring 63 is provided within the inner end portion of link 45 for bearing against one face thereof and at its other end being received within a cup 64 for applying pressure against pin 49 so as to conduce to the retention of link 45 in operative position and to conduce to the maintenance of same in any selected position within its arc of swing.

Figure 4:
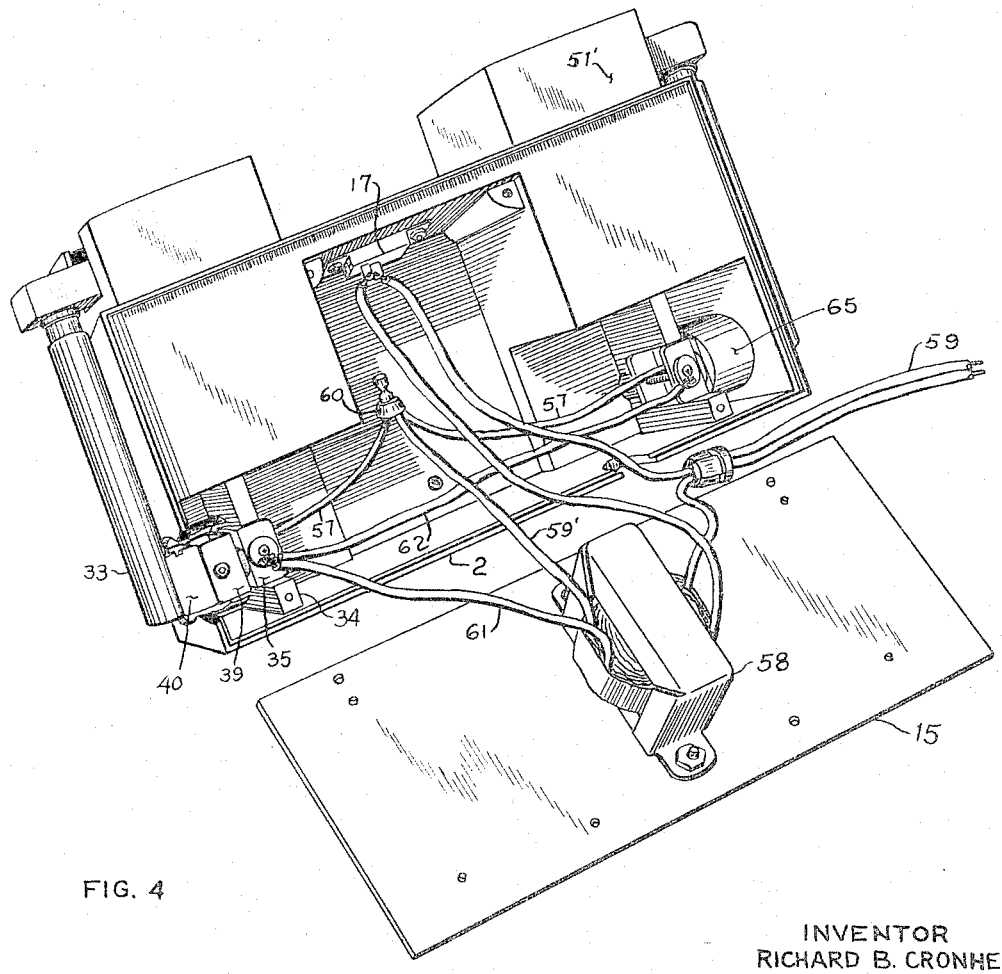
FIGURE 4 is a perspective view of the underside of the body in open position.
Figure 5:
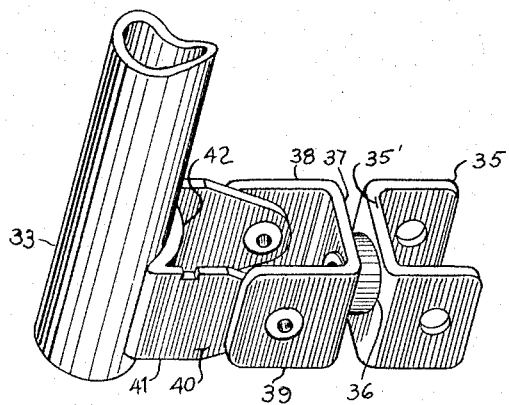
FIGURE 5 is a fragmentary enlarged perspective view of the mounting means for the lamp arms.

With reference now being made to FIGURE 4 it will be seen that the present invention may be utilized with any conventional 110 volt electrical outlet; there being a line 59 connecting the source of electrical energy (not shown) through operating switch 17 to the high side of transformer 58. The low side of transformer 58 is thus connected as by a lead 59' to a junction 60 for conductors 57 which progress, as above described, to sockets 56 of the related lamps L, L' for illumination of the associated bulbs 55. For completing the electrical circuit, transformer 58 is connected by a ground wire 61 to one base bracket 35 which latter is connected to the other base bracket by a common ground wire 62. Upon operation of switch 17 lamp bulbs 55 of each lamp L, L' are illuminated, the same having high intensity characteristics, and being readily serviced from the usual 110 volt input.

As may be seen in FIGURE 4, a thick walled annular shield 65 is provided within each end wall opening 43 for reinforcing purposes.

In view of the foregoing it will be seen that the mirror of the present invention constitutes a marked advance in the art in that the same is adapted for collapsing into an exceedingly compact state (FIGURE 2) which requires minimum space for transportation or storage purposes. Through its novel construction the mirror of the present invention can be readily opened for usage by swinging mirror frame 29 upwardly at the desired degree of inclination to the vertical and with either or both lamps L, L' being removed from their position of rest within the recesses 11, 12, for presentation of the light either toward the user's face or toward the mirror as may be desired. In view of the fact that each of the lamps L, L' is mounted independently of the other, each may be positioned to highlight the desired areas without regard to the location of the other. The degree of adjustability of each of the lamps L, L' is most extensive being multiplanar so that the range of adjustment is greater than that required by any user.

Through the novel electrical system of this invention the lamps L, L' will cast high intensity beams for maximum illumination and with the bulbs being relatively small, as distinguished from the conventional large incandescent bulbs.

The illuminated mirror of this invention is most sturdily built and adapted for relatively hard usage being intended primarily for travel purposes. The same is sturdy and reliable in position for use.

It should be understood that changes and modifications in the formation, construction, and arrangement and combination of the several parts of the illuminated mirror may be made and substituted for these herein shown and described without departing from the nature and principle of my invention.

Having described my invention, what I desire to obtain by Letters Patent is:

1. A portable mirror comprising housing means having a rearward wall, a pair of end walls, a top wall extending between said end walls in their rearward portion, a front wall portion provided intermediate said end walls and spaced therefrom to define therewith a pair of upwardly and forwardly opening recesses, a mirror frame pivotally mounted on said top wall for movement downwardly toward the said top wall into collapsed position and upwardly away from same into operative position, at least one mirror-surface member carried by said mirror frame, a pair of arms swingbly mounted at their normally lower or inner ends upon opposite ends of said housing means, each of said arms comprising a plurality of telescopically related sections for selected extension of said arms, lamp means carried on the end of each of said arms, said lamp means being receivable within said recesses when said arms are in inoperative position, and means for effecting illumination of said lamp means.

2. A portable mirror comprising housing means defining a downwardly opening compartment and a pair of upwardly and forwardly opening recesses, a mirror frame pivotally mounted on said housing means for swingable movement between downward or collapsed position and upwardly or operative position, at least one mirror surface member carried by said frame, a pair of arms mounted at their normally lower or inner ends in the opposite rearward end portions of said housing, said arms being adapted for swingable movement both toward and away from said mirror, means for rotating said arms at their lower ends about a horizontal axis extending through said housing, lamp means carried at the outer ends of each of said arms, means for optionally extending and retracting said arms, said lamp means being receivable in said housing means recesses when in inoperative or collapsed position, and means for effecting illumination of said lamp means.

3. A portable mirror comprising a molded body, wall portions provided in said body for defining a downwardly opening housing and a pair of upwardly and forwardly opening recesses, a mirror-receiving frame swingably mounted on the upper portion of said body for movement downwardly toward same into collapsed position and upwardly away from same into operative position, a pair of arms mounted on said housing at the opposite ends thereof, each of said arms being comprised of interfitting, telescopically related sections for selected extension of said arms, means for effecting swingable movement of said arms in a multiplicity of planes for predetermined adjustment, lamp means carried by said arms at their outer ends, said lamp means being receivable within said recesses when in inoperative position, and means for effecting illumination of said lamp means.

4. A portable mirror as defined in claim 3 and further characterized by said lamp means being of high intensity character and adapted for energization by a relatively reduced voltage, a source of electrical energy and transformer means provided in said body for requisite stepping-down of the voltage from the said source.

5. A portable mirror as defined in claim 3 and further characterized by said lamp means comprising a lamp housing mounted on the outer end of each of said arms, reflector means carried within said lamp housing, said housing being dimensioned for snug reception within said body recesses.

6. A portable mirror as defined in claim 5 and further characterized by said lamp housing being swingably mounted upon the ends of said arms for movement between co-axial and axially parallel relationship with said arms.

7. A portable mirror as defined in claim 5 and further characterized by said rotatable means comprising a swivel unit mounted within said housing adjacent each of said end walls, each of said end walls having an aperture through which the related swivel unit extends, means pivotally connecting the lower end of each arm to a swivel unit for pivotal movement of said arm inwardly toward and outwardly away from said mirror.

8. A portable mirror as defined in claim 7 and further characterized by a second swivel unit connecting the upper end of each of said arms with the related lamp means for rotation of the latter through an angle of 360 degrees.

9. A portable mirror comprising housing means having a rearward wall, a pair of end walls, a top wall extending between said end walls and their rearward portion, a front wall portion provided intermediate said end walls and spaced therefrom to define therewith a pair of upwardly and forwardly opening recesses, a mirror frame pivotally mounted on said top wall for movement downwardly toward the said top wall into collapsed position and upwardly away from same into operative position, at least one mirror-surface member carried by said mirror frame, first swivel units, each being mounted on opposite portions of said housing means, a pair of arms having inner and outer ends, means for pivotally connecting the inner end of each of said arms to the related first swivel unit for effecting swingable movement of the said arms in a multiplicity of planes for a predetermined adjustment, a pair of lamp members, a link member connecting each of said lamp members to the outer end of each of said arms, said lamp member being pivotally engaged to said link member so as to allow rocking of said lamp member within substantially a 90° arc, a second swivel unit connecting the outer end of each arm to said link member for allowing rotation of said lamp member around the axis of said arm, means for optionally extending and retracting said arms, said lamp members being receivable in said housing means recesses when in inoperative or collapsed position, and means for effecting the illumination of said lamp members.

10. A portable mirror comprising housing means having a rearward wall, a pair of end walls, a top wall extending between said end walls in their rearward portion, a front wall portion cooperating with said end walls to define therewith at least one upwardly and forwardly opening recess, a mirror frame pivotally mounted on said top wall for movement downwardly toward the said top wall into collapsed position and upwardly away from same into operative position, at least one mirror-surface member carried by said mirror frame, an arm swingably mounted at its normally lower or inner end upon said housing means, said arm comprising a plurality of telescopically related sections for selected extension of said arm, lamp means carried on the end of said arm, said lamp means being receivable within said recess when said arm is in inoperative position, and means for effecting illumination of said lamp means.

References Cited

UNITED STATES PATENTS

| | | | |
|---|---|---|---|
| 404,110 | 5/1889 | Pinous | 240—4.2 |
| 960,596 | 6/1910 | Spinner | 240—4.1 |
| 1,927,796 | 9/1933 | Hays | 240—81 |
| 3,310,673 | 3/1967 | Fletcher | 240—81 |

NORTON ANSHER, *Primary Examiner.*

M. H. HAYES, *Assistant Examiner.*